United States Patent [19]

Weston

[11] 4,392,502

[45] Jul. 12, 1983

[54] INTERNAL COMBUSTION ENGINE THROTTLE CONTROL

[75] Inventor: Paul Weston, Solihull, England

[73] Assignee: Lucas Industries Limited, Birmingham, England

[21] Appl. No.: 229,384

[22] Filed: Jan. 28, 1981

[30] Foreign Application Priority Data

Jan. 30, 1980 [GB] United Kingdom ................ 8003183

[51] Int. Cl.[3] ......................... F02D 9/00; B60K 31/00

[52] U.S. Cl. .................................. 123/342; 123/352; 123/396

[58] Field of Search ............... 123/342, 399, 400, 361, 123/396, 397, 352, 353, 354

[56] References Cited

U.S. PATENT DOCUMENTS 4,099,592 7/1978 Gonzales ....................... 123/352 X 4,224,907 9/1980 Lefeuvre et al. .................. 123/352

4,346,776 8/1982 Taplin ............................ 123/342 X

*Primary Examiner*—Tony M. Argenbright

*Attorney, Agent, or Firm*—Ladas & Parry

[57] ABSTRACT

An internal combustion engine throttle control includes an extensible linkage connecting the throttle pedal to the butterfly valve. A linkage contraction spring urges the butterfly valve open and a butterfly return spring 22 urges it closed. The linkage is such that when the drivers foot is lifted from the pedal, a pedal return spring acts to shorten the linkage to its minimum extension and rapidly close the butterfly valve. A part of the linkage is urged by the linkage contraction spring against a cam forming part of a limited authority closed loop servo-mechanism, acting to limit throttle opening in accordance with one or more engine or vehicle parameters.

12 Claims, 2 Drawing Figures

INTERNAL COMBUSTION ENGINE THROTTLE CONTROL

This invention relates to an internal combustion engine throttle control.

The fuel economy of internal combustion engines can be significantly improved by utilizing modern technology in the precise control of engine fuelling and ignition. Furthermore, advances are now being made in economy by the utilization of mechanical continuously variable transmissions. Generally speaking, however, fuel can still be wasted by the vehicle driver opening the engine throttle wider than is necessary for the existing engine speed, road speed and engine load conditions.

In accordance with the invention there is provided an internal combustion engine throttle control comprising an accelerator pedal, a butterfly valve and linkage means connecting the accelerator pedal to the butterfly valve and including a first movable member coupled to the accelerator pedal, a second movable member coupled to the butterfly valve, first spring means connecting the first movable member to the second movable member whereby depression of the accelerator stresses said first spring means to tend to open the butterfly valve, mechanical limit means restricting relative motion of the ends of said first spring means as said first spring means is relaxed, second spring means acting to urge the butterfly valve towards a closed position, whereby lifting of the drivers foot from the accelerator pedal causes relaxing of said first spring means to the limit permitted by said limit means and movement of the butterfly valve to its closed position by said second spring means, a cam, cam follower means mounted on said second movable member and urged into engagement with said cam by the action of said first spring means so as to limit opening of the butterfly valve in accordance with the position of said cam, a servo-motor drivingly connected to said cam, and said cam being shaped to provide a desired non-linear relationship between butterfly valve opening and displacement of the cam by the servo-motor, and control means for the servo-motor operating to displace the cam to a position dependent on at least one vehicle operating parameter.

The control means may include a lowest wins gate which selects the lower of two signals representing respectively an "economical" butterfly valve position and the difference between a maximum engine speed and actual engine speed, the output of the lowest wins gate controlling the servo-motor via a position control loop.

Alternatively the control circuit may include only an engine speed control loop.

An example of the invention is shown in the accompanying drawing in which.

Figure 1:
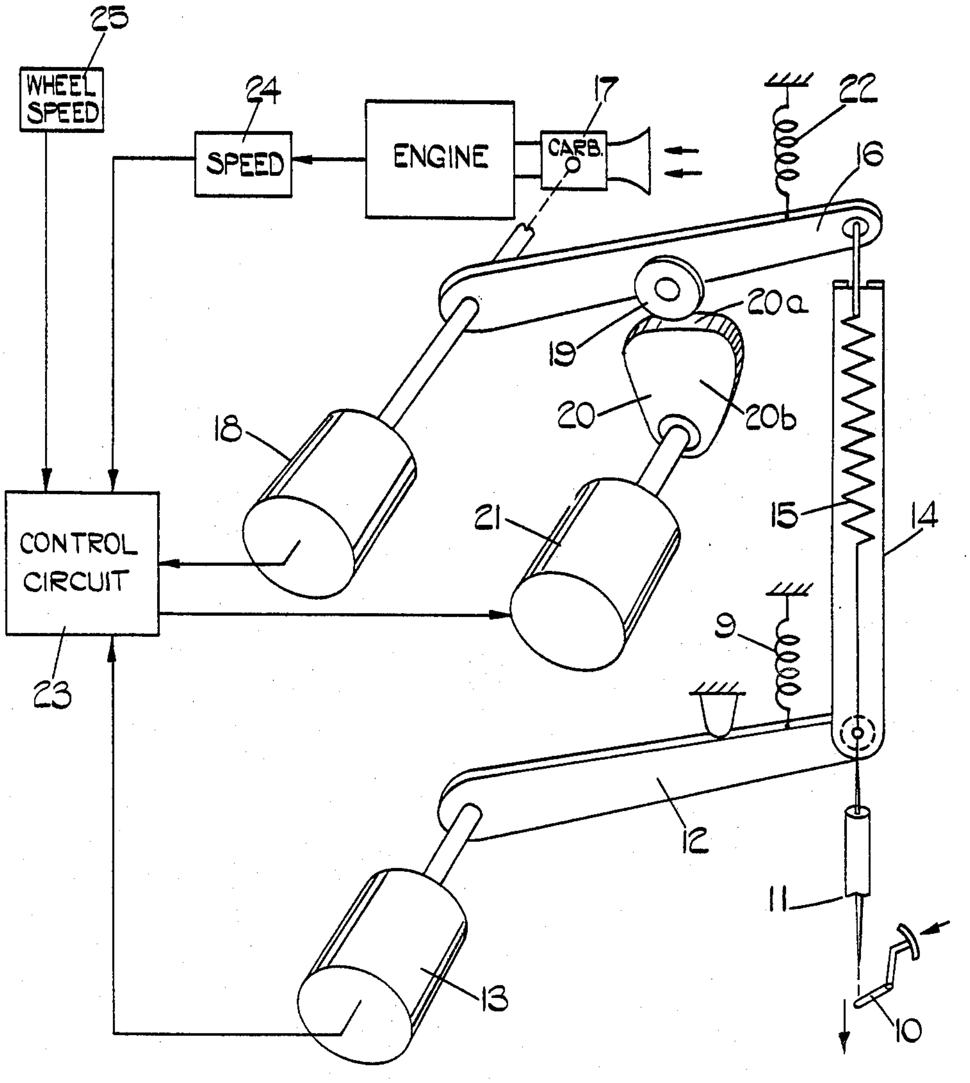
FIG. 1 is a block diagram of the throttle control.
Figure 2:
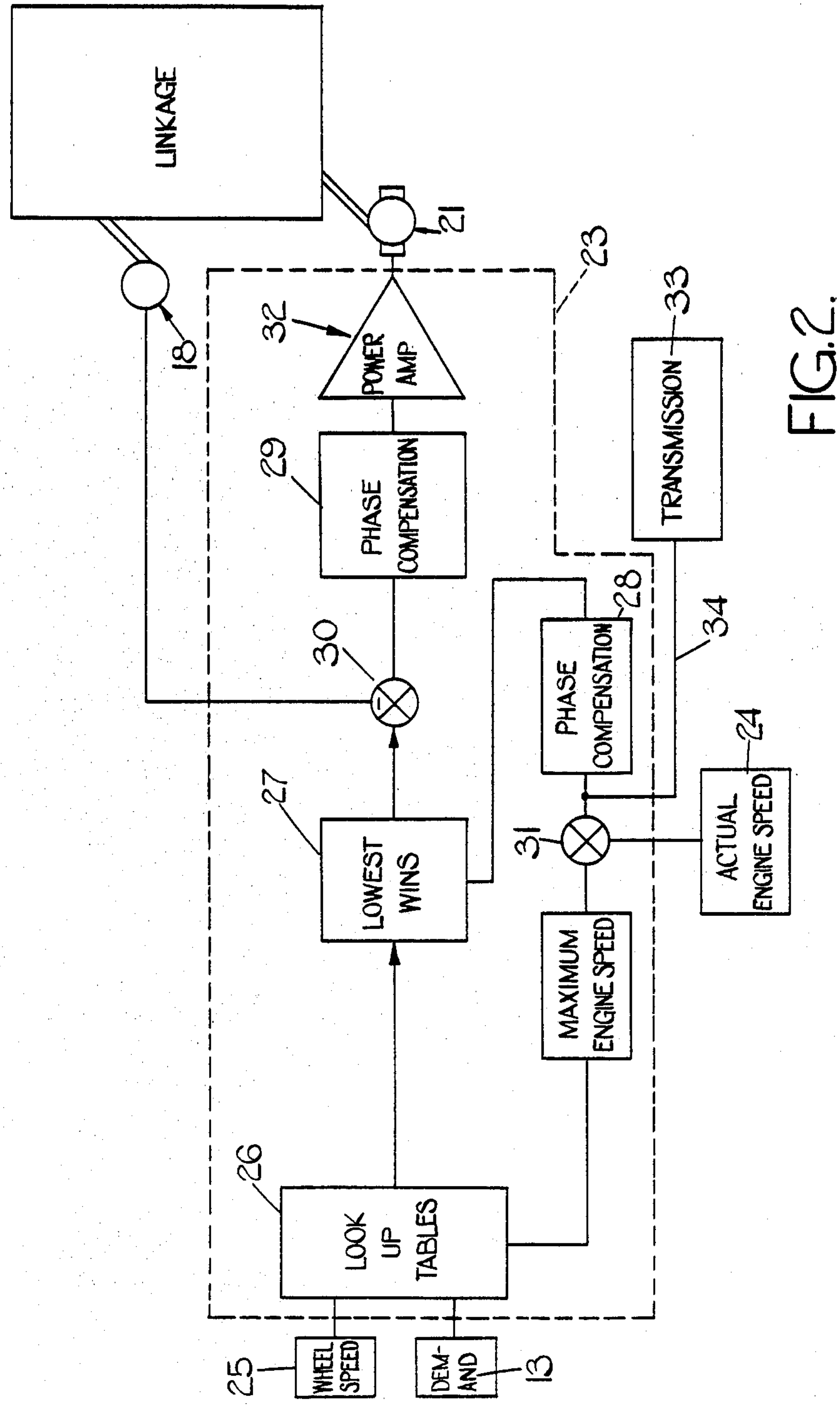
FIG. 2 is a block diagram of an electrical circuit used in the control.

The diagram shows the drivers control as a foot pedal 10 which is connected by a cable 11 to a demand lever 12 to which a demand potentiometer 13 is mechanically connected to provide a transducer sensitive to the driver's control. The lever 12 is also pivotally connected to a link member 14 which carries a tension spring 15 coupled at one end to the link member 14 (or to the lever 12) and at the other end to a throttle lever 16. The lever 16 is pivoted on an axis spaced from and parallel to that of the lever 12 and is mechanically connected to the throttle valve in the engine carburettor 17 and also to a throttle potentiometer 18. A ball-race 19 mounted on the lever 16 is urged by the influence of the spring 15 into engagement with a cam on the shaft of a motor/-gearbox unit 21. The cam may be shaped as shown with a part 20*a* of nearly constant radius at one end of its arc of travel, the remainder 20*b* being shaped to give more rapid radial displacement. A light return spring 22 acts on the lever 16 to urge it in throttle closing direction.

The potentiometers 13 and 18 provide inputs to a microprocessor-based control circuit 23 which also has inputs from an engine speed transducer 24 and a road wheel speed transducer 25. The control unit 23 consists of a look up table unit 26 a lowest wins circuit 27, phase compensation units 28 and 29, difference amplifiers 30 and 31 and power amplifier 32.

The operation of the control system is as follows. The most economical throttle position is determined from the wheel speed and drivers demand signals in the look up table unit 26.

A maximum engine speed signal is also determined in unit 26. The actual engine speed from transducer 24 is subtracted from the maximum engine speed in difference amplifier 31. The resulting error signal 34 can be used to control the shifting of a transmission 33. This error signal 34 is processed in the phase compensation network 28 and is then fed to "lowest wins" unit 27 together with the most economical throttle angle signal from 26. The one of these two signals that demands the most closed throttle angle is passed on from "wins circuit" 27 to difference amplifier 30. Here the actual position signal from potentiometer 18 is subtracted from it.

The error signal is then fed through phase compensation block 29 to power amplifier 32 which in turn drives the motor 21.

The elements 30, 29, 32, 21, and 18 together with the mechanical linkages in FIG. 1 constitute a position feedback control system for carburettor butterfly 17.

The maximum engine speed is selected for economical operation of the engine/transmission combination and has a suitable idle speed programmed for use when the drivers demand is zero. The engine speed error signal 34 is then processed in phase compensator 28 to give a butterfly angle demand to the position feedback loop that will give the desired idle speed, regardless of changes in engine temperature or auxiliary load. The force applied by the spring 15 to the lever 16 when the throttle pedal is depressed ensures that the ball race 19 follows the cam, the portion 20*a* ensuring that fine control is obtained when the throttle valve is close to its closed position. When the foot pedal 10 is released the spring-loading 9 of the pedal 10 itself can urge the link 14 into direct contact with the lever 16 turning this to close the throttle valve in the event that the motor 21 fails to do this. This ensures fail-safe operation.

In an alternative embodiment, not shown, the potentiometer 18 amplifier 30, lowest wins gate 27 and one of the phase compensation circuits 28, 29 is omitted, the power amplifier controlling the motor 21 in accordance with the engine speed error.

I claim:

1. An internal combustion engine throttle control comprising an accelerator pedal, a butterfly valve and linkage means connecting the accelerator pedal to the butterfly valve and including a first movable member coupled to the accelerator pedal, a second movable member coupled to the butterfly valve, first spring means connecting the first movable member to the second movable member whereby depression of the accelerator stresses said first spring means to tend to open the butterfly valve, mechanical limit means restricting relative motion of the ends of said first spring means as said first spring means is relaxed, second spring means acting to urge the butterfly valve towards a closed position, whereby lifting of the drivers foot from the accelerator pedal causes relaxing of said first spring means to the limit permitted by said limit means and movement of the butterfly valve to its closed position by said second spring means, a cam, cam follower means mounted on said second movable member and urged into engagement with said cam by the action of said first spring means so as to limit opening of the butterfly valve in accordance with the position of said cam, a servo-motor drivingly connected to said cam, and said cam being shaped to provide a desired non-linear relationship between butterfly valve opening and displacement of the cam by the servo-motor, and control means for the servo-motor operating to displace the cam to a position dependent on at least one vehicle operating parameter.

2. An internal combustion engine throttle control as claimed in claim 1 further comprising third spring means acting to return the accelerator pedal to a raised rest position and stop means limiting movement of the pedal under the influence of said third spring means.

3. An internal combustion engine throttle control as claimed in claim 1 in which the cam profile is shaped to provide relatively slower motion of the butterfly valve with respect to motion of the servo-motor at small throttle openings than at larger throttle openings.

4. An internal combustion engine throttle control as claimed in claim 1 in which said control means comprises reference signal generating means, which produces a reference signal dependent on said at least one vehicle operating parameter, butterfly valve position sensing means which produces a feedback signal dependent on the butterfly valve position, error amplifier means receiving said reference signal and said feedback signal and means sensitive to the output of the error amplifier means driving said servo-motor in a manner to cause the feedback signal to approach the reference signal.

5. An internal combustion engine throttle control as claimed in claim 4 in which said means sensitive to the output of the error amplifier means comprises a phase compensation circuit and a power amplifier.

6. An internal combustion engine throttle control as claimed in claim 4 in which said reference signal generating means comprises means for generating a signal representing a best economy butterfly valve position in accordance with the measured values of vehicle speed and accelerator pedal position.

7. An internal combustion engine throttle control as claimed in claim 4 in which said reference signal generating means comprises means for generating an engine speed reference signal, an engine speed transducer circuit producing an engine speed signal, and a second error amplifier connected to the engine speed reference signal generating means and to said engine speed transducer.

8. An internal combustion engine throttle control as claimed in claim 7 further comprising a phase compensation circuit having its input connected to the output of said second error amplifier.

9. An internal combustion engine throttle control as claimed in claim 7 in which said engine speed reference signal generating means is arranged to generate a signal representing desired engine idling speed.

10. An internal combustion engine as claimed in claim 7 in which said engine speed reference signal generating means is arranged to generate a signal representing an upper limit to engine speed.

11. An internal combustion engine throttle control as claimed in claim 7 in which said engine speed reference signal generating means comprises a function generator receiving inputs corresponding to vehicle speed and accelerator pedal position and generates a signal varying as a function of these variables.

12. An internal combustion engine throttle control as claimed in claim 11 in which the reference signal generating means also comprises additional means for generating a signal representing a best economy butterfly valve position in accordance with the measured values of vehicle speed and accelerator pedal position and a "lowest wins" gate having inputs from said second error amplifier and from said additional means and providing the reference signal as its output.

* * * * *